United States Patent Office 3,790,524
Patented Feb. 5, 1974

3,790,524
PROCESS FOR PREPARING VULCANIZED
EPIHALOHYDRIN POLYMERS
Yoshiomi Saito, Kamakura, Hiroshi Sasaki, Kawasaki, Mamoru Yamaguchi, Yokohama, Hideo Fukuda, Chigasaki, Humio Yamada, Yokohama, and Koji Kimura, Tokyo, Japan, assignors to The Japanese Geon Company, Ltd., Tokyo, Japan
No Drawing. Filed Apr. 20, 1971, Ser. No. 135,779
Claims priority, application Japan, Apr. 25, 1970, 45/35,119
Int. Cl. C08g 23/06, 51/60
U.S. Cl. 260—45.8 N                                  8 Claims

ABSTRACT OF THE DISCLOSURE

A process for preparing vulcanized epihalohydrin polymers which comprises heating at least a polymer selected from the group consisting of a homopolymer of epihalohydrin and a copolymer of epihalohydrin with at least one other copolymerizable monomer in the presence of (A) 0.1–10 parts by weight of at least one compound selected from the group consisting of polyalkylenepolyamines, polyalkylenepolyamine carbamates and thioureas which are optionally substituted with alkyl groups of 1–4 carbon atoms leaving at least one hydrogen atom unsubstituted, (B) 1–20 parts by weight of magnesium oxide and (C) 0.2–5 parts by weight of 2-mercaptobenzimidazole.

---

This invention relates to a process for preparing vulcanized epihalohydrin homopolymers or copolymers with a novel system of vulcanizing agents.

Vulcanized epihalohydrin polymers have been prepared by conventional methods with such vulcanizing agents as polyamines (U.S. Pat. 3,026,270), an amine and at least one other agent selected from the group consisting of sulphur, dithiocarbamates, thiuram sulfides and thiazoles (U.S. Pat. 3,026,305), or 2-mercaptoimidazolines with compounds of Groups II or IV–A metals of periodic table (U.S. Pat. 3,341,491). Further, it is known that stabilized epihalohydrin polymer compositions are prepared with a polyamine cross-linking agent, a lead compound and a nitro-containing antioxidant (U.S. Pat. 3,239,486).

As a result of various studies on the heat-aging properties of vulcanized epihalohydrin polymers manufactured by the use of such vulcanizing agents and antioxidants, the inventors have found that a vulcanizate containing 2-mercaptoimidazoline, red lead and phenol- or amine-based antioxidants which are employed for ordinary diene rubber exhibits good heat-aging property. When a thiourea or an amine is employed in place of 2-mercaptoimidazoline and when magnesium oxide is used instead of red lead, the vulcanizate obtained shows obviously inferior heat-aging properties with an increased tendency toward softening and aging, which will be clarified by reference examples given below. However, applications of the vulcanizate are limited as the vulcanizate cannot be used for light-color blending because it contains red lead having staining qualities and also because it often takes on a metallic luster on its surface. Furthermore, since red lead tends to stain the mold, work required to remove such stains decreases the productivity.

The purposes of this invention, therefore, are to resolve all those problems and to produce vulcanized epihalohydrin polymers having excellent heat-aging properties.

The above purposes of this invention can be attained by the process which comprises heating a homopolymer of epihalohydrin or a copolymer of epihalohydrin with at least one other copolymerizable monomer in the presence of (A) at least one compound selected from the group consisting of polyalkylenepolyamines, polyalkylenepolyamine carbamates and thioureas which are optionally substituted with alkyl groups of 1–4 carbon atoms leaving at least one hydrogen atom unsubstituted, (B) magnesium oxide and (C) 2-mercaptobenzimidazole.

By the process of this invention, vulcanized epihalohydrin polymers with excellent heat-aging properties which are equivalent or superior to that which can be attained by the 2-mercaptoimidazoline/red lead vulcanizing system, and with limited staining properties enabling light-color blending, can be prepared.

A feature of this invention consists in the joint use of magnesium oxide and 2-mercaptobenzimidazole. Namely, whereas in the case of the conventional combination of vulcanizing agents and anti-oxidants, the heat-aging properties of a vulcanizate with magnesium oxide is inferior to that of vulcanizate with red lead. In the cases where polyalkylenepolyamines or their carbamates or thioureas and red lead or magnesium oxide and 2-mercaptobenzimidazole are employed jointly, the vulcanizate with magnesium oxide provides improved heat-aging properties. Although it is not yet clear what mechanism causes such a notable phenomenon, it is probably attributable to some multiplying effects caused by the coexistence of 2-mercaptobenzimidazole and magnesium oxide. Further studies by the inventors on the properties of 2-mercaptobenzimidazole have revealed that it has little antioxidizing properties unlike the amine- or phenol-based antioxidants in general use. For instance, it was found that its speed of oxygen absorption when uniformly dispersed in an epichlorohydrin polymer in a quantity of 2 percent by weight of said polymer, was 40 times that of phenyl-$\beta$-naphthylamine and 12 times that of styrenated phenol.

Furthermore, in this invention, magnesium oxide is employed as co-agent, and therefore the aforementioned various problems which are caused by the use of red lead can be completely avoided.

The epihalohydrin polymers vulcanizable in accordance with this invention comprise homopolymers of epichlorohydrin and/or epibromohydrin, copolymers of two different epihalohydrins, and copolymers of at least one epihalohydrin with at least one other copolymerizable monomer. Examples of other copolymerizable monomers include epoxides such as ethylene oxide, propylene, propylene oxide, butylene oxide, cyclohexene, oxide, butadiene monoxide, ethyl glycidyl ether, allyl glycidyl ether, tetrahydrofuran and trioxane; isocyanates such as ethyl isocyanate, phenyl isocyanate and 2,4-tolylene diisocyanate; alkyl acrylates such as ethyl acrylate and methyl methacrylate; cyclic acid anhydrides such as maleic anhydride, succinic anhydride and phthalic anhydride; vinyl ketones such as methyl vinyl ketone and cyclohexyl vinyl ketone; diolefins such as butadiene, isoprene and pentadiene; monoolefins such as ethylene, propylene and butene-1; nitriles such as acrylonitrile and methacrylonitrile; and styrene.

Of the agents used for vulcanizing those epihalohydrin polymers in this invention, diethylenetriamine, triethylenetetramine, hexamethylene-diamine, hexamethylenetetraamine, piperazine (a cyclic polyalkylenepolyamine) and Trimene Base (trademark of Uniroyal, Inc.), hexamethylenediamine, carbamate and ethylene-diamine carbamate are representative examples of polyalkylenepolyamines and their carbamates of (A). Another example pertaining to (A) is thioureas with the following general formula:

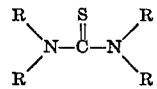

wherein at least one of the R's is hydrogen, and the rest are alkyl groups of 1 to 4 carbons and whose representative examples are thiourea, mono-, di- or tri-ethyl thiourea and mono-, di- or tri-butyl thiourea.

2-mercaptobenzimidazole of (C) is an agent which is represented by the following formula:

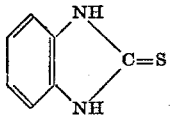

After being blended in natural rubber, styrene butadiene rubber and acrylonitrile-butadiene rubber, it is generally utilized as a secondary antioxidant to prevent the breakage of rubber chains by peroxide decomposition or as a peptizer for natural rubber.

In the case of U.S. Pat. 3,026,305, for the vulcanization of an epihalohydrin polymer, 2-mercaptobenzothiazole which is employed together with amines and magnesium oxide acts as a vulcanization accelerator. In this invention, however, 2-mercaptobenzimidazole hardly exhibits a vulcanization accelerating function and acts as an agent to markedly improve the heat-aging property, and therefore, 2-mercaptobenzimidazole functions entirely differently in the respective cases. As clearly shown by the following examples, the heat-aging property can be drastically improved by the present invention.

it is sometimes heated at approximately 100 to 150° C. for about 1 hour to three days.

In addition to the aforementioned agents, other ordinary agents such as reinforcing agents, fillers, softening agents, plasticizers, stabilizers, activating agents and other anti-oxidants may be added as necessary.

This invention will be explained in greater detail by means of the following examples. Parts of components to be compounded in the examples will be shown by weight.

EXAMPLES 1-8

To various conventional vulcanizing agents and antioxidants, red lead or magnesium oxide was added as a co-agent, and comparison was made on the effects caused to heat-aging properties by each one of the above-mentioned coagents. After the components shown in Table 1 were kneaded together on 6-inch rolls at 30 to 40° C. and for approximately 30 minutes, the mixed compounds were vulcanized at 155° C. for 30 minutes. Then the heat-aging properties of the obtained vulcanizate (JIS K-6301, heating temperature: 150° C.) were measured. It is obvious from the results given in Table 1 that when the conventional vulcanizing agent and the antioxidant are combined, in each case, red lead is superior to magnesium oxide in improving the heat-aging property.

TABLE 1

| | Example | | | | | | | |
|---|---|---|---|---|---|---|---|---|
| | 1 | 2 | 3 | 4 | 5 | 6 | 7 | 8 |
| Compounding components: | | | | | | | | |
| Epichlorohydrin polymer [1] | 100 | 100 | 100 | 100 | 100 | 100 | 100 | 100 |
| Tin stearate | 2 | 2 | 2 | 2 | 2 | 2 | 2 | 2 |
| FEF carbon black | 40 | 40 | 40 | 40 | 40 | 40 | 40 | 40 |
| Phenyl-β-naphthylamine | 1.5 | 1.4 | 1.5 | 1.5 | 1.5 | 1.5 | 1.5 | 1.0 |
| Nickel dibutyl dithiocarbamate | 0.5 | 0.5 | 0.5 | 0.5 | 0.5 | 0.5 | 0.5 | 0.5 |
| 2-mercaptoimidazoline | 2 | 2 | | | | | | |
| Dibutyl thiourea | | | 3.8 | 3.8 | | | | |
| Trimene base | | | | | 3 | 3 | | |
| Hexamethylenediamine carbamate [2] | | | | | | | 1 | 1 |
| Red lead | 5 | | 5 | | 5 | | 5 | |
| Magnesium oxide | | 5 | | 5 | | 5 | | 5 |
| Heat-aging properties of the vulcanizates: | | | | | | | | |
| Tensile strength (kg./cm.²) after— | | | | | | | | |
| 0 day [4] | 142 | 113 | 148 | 121 | 139 | 119 | 151 | 125 |
| 3 days | 166 | 81 | 47 | 31 | 112 | 60 | 86 | 10 |
| 6 days | 153 | 62 | 7 | S | 14 | S | S | S |
| 9 days | 132 | 53 | ³S | | 28 | | | |
| Elongation (percent) after— | | | | | | | | |
| 0 day | 480 | 550 | 660 | 710 | 420 | 440 | 430 | 430 |
| 3 days | 290 | 460 | 340 | 680 | 280 | 620 | 370 | 740 |
| 6 days | 260 | 430 | 250 | S | 310 | S | S | S |
| 9 days | 260 | 410 | S | | 190 | | | |
| Hardness (JIS) after— | | | | | | | | |
| 0 day | 65 | 69 | 65 | 61 | 75 | 74 | 71 | 75 |
| 3 days | 77 | 68 | 67 | 56 | 80 | 68 | 78 | 68 |
| 6 days | 74 | 66 | 54 | S | 73 | S | 68 | S |
| 9 days | 74 | 66 | 51 | | 88 | | | |

[1] Gechron 1000 made by The Japanese Geon Co. (hereinafter the same).
[2] Diak No. 1 made by Du Pont (hereinafter the same).
[3] "S" denotes that the vulcanizates softened and aged (hereinafter the same).
[4] No heat-aging (hereinafter the same).

In this invention, quantities of the three agents for each 100 parts by weight of epihalohydrin polymers are as follows: thioureas, polyalkylenepolyamines or polyalkylenepolyamine carbamates 0.1–10 (preferably 0.5–4) parts by weight, magnesium oxide 1–20 (preferably 3–10) parts by weight, and 2-mercaptobenzimidazole 0.2–5 (preferably 0.4–2) parts by weight.

The purpose of the present invention may be essentially attained by heating epihalohydrin polymers in the presence of the above-mentioned three components. Furthermore, by employing sulphur jointly, the tensile strength of the vulcanizates under normal conditions and after heat-aging may be even more improved. Volume of sulphur to be used is 0.1–5 (preferably 0.5–2) parts by weight against 100 parts of the polymer by weight.

Vulcanization in this invention may be attained by heating the polymer after being compounded with the aforementioned agents by ordinary methods such as roll mixing, Banbury mixing or solution mixing. Vulcanization temperature will be approximately 120 to 180° C. and vulcanization time 10 to 120 minutes. Furthermore, in order to minimize permanent set at high temperatures,

EXAMPLES 9-18

A comparison was made as to the effects caused on heat-aging property when either magnesium oxide or red lead was added to hexamethylenediamine carbamate and 2-mercaptobenzimidazole. Furthermore, effects of volume change by 2-mercaptobenzimidazole were studied. Heat-aging properties (heating temperature: 160° C.) of vulcanizates which were obtained in the same manner as in Examples 1-8 are indicated in Table 2. Added for reference are the case of 2-mercaptoimidazoline/red lead as a representative known vulcanizing agent and the case where 2-mercaptobenzothiazole is employed in place of 2-mercaptobenzimidazole of this invention. As the results in Table 2 show, the heat-aging property of the vulcanizates can be improved by increasing the amount of 2-mercaptobenzimidazole in both systems. It is seen that at any level of consumption of 2-mercaptobenzimidazole, magnesium oxide system is superior and that the effects of using increased amount of 2-mercaptobenzimidazole are greater in this system. It is also seen that in comparison with the 2-mercaptoimidazoline/red lead system, magnesium oxide system presents, at 0.8 part or more by weight, equal or improved heat-aging properties. It is obvious, furthermore, that when 2-mercaptobenzothiazole is used instead of 2-mercaptobenzimidazole required by this invention, resultant heat-aging properties are inferior to that attainable by this invention.

polyalkylene-polyamines in place of hexamethylenediamine carbamate which was used in Examples 9–16 and 18 were measured. The compounded components and the results of measurement are given in Table 3. It may be seen from Table 3 that with any amine, magnesium oxide system produces better heat-aging properties than red lead system and that through joint use of sulphur, even better tensile strength can be obtained even under a heated condition.

TABLE 2

| | Example | | | | | | | | | |
|---|---|---|---|---|---|---|---|---|---|---|
| | 9 | 10 | 11 | 12 | 13 | 14 | 15 | 16 | 17 | 18 |
| Compounding components: | | | | | | | | | | |
| Epichlorohydrin polymer | 100 | 100 | 100 | 100 | 100 | 100 | 100 | 100 | 100 | 100 |
| Tin stearate | 2 | 2 | 2 | 2 | 2 | 2 | 2 | 2 | 2 | 2 |
| FEF carbon black | 40 | 40 | 40 | 40 | 40 | 40 | 40 | 40 | 40 | 40 |
| Phenyl-β-naphthylamine | 1 | 1 | 1 | 1 | 1 | 1 | 1 | 1 | 1 | 1 |
| Nickel dibutyl dithiocarbamate | 0.5 | 0.5 | 0.5 | 0.5 | 0.5 | 0.5 | 0.5 | 0.5 | 0.5 | 0.5 |
| Hexamethylenediamine carbamate | 1 | 1 | 1 | 1 | 1 | 1 | 1 | 1 | | 1 |
| 2-mercaptoimidazoline | | | | | | | | | 1.5 | |
| Red lead | 5 | | 5 | | 5 | | 5 | | 5 | |
| Magnesium oxide | | 5 | | 5 | | 5 | | 5 | | 5 |
| 2-mercaptobenzimidazole | 0.4 | 0.4 | 0.8 | 0.8 | 1.2 | 1.2 | 2.0 | 2.0 | | |
| 2-mercaptobenzothiazole | | | | | | | | | | 2.0 |
| Heat-aging properties of vulcanizates: | | | | | | | | | | |
| Tensile strength (kg./cm.²) after— | | | | | | | | | | |
| 0 day | 149 | 130 | 153 | 130 | 151 | 133 | 146 | 127 | 152 | 135 |
| 2 days | S | 24 | S | 73 | 53 | 106 | 92 | 143 | 137 | 112 |
| 4 days | | S | | 52 | S | 77 | 63 | 114 | 59 | 43 |
| 6 days | | | | 37 | | 60 | 55 | 116 | 58 | S |
| 9 days | | | | S | | 31 | 35 | 75 | S | |
| 12 days | | | | | | 22 | 30 | 57 | | |
| Elongation (percent) after — | | | | | | | | | | |
| 0 day | 380 | 660 | 410 | 690 | 430 | 670 | 420 | 740 | 490 | 620 |
| 2 days | S | 510 | S | 360 | 300 | 290 | 190 | 170 | 260 | 150 |
| 4 days | | S | | 380 | S | 320 | 180 | 190 | 190 | 140 |
| 6 days | | | | 410 | | 340 | 190 | 220 | 290 | S |
| 9 days | | | | S | | 370 | 180 | 210 | S | |
| 12 days | | | | | | 190 | 160 | 110 | | |
| 100% modulus (kg./cm.²) after— | | | | | | | | | | |
| 0 day | 35 | 18 | 35 | 19 | 34 | 18 | 31 | 18 | 33 | 20 |
| 2 days | S | 14 | S | 26 | 21 | 36 | 45 | 77 | 48 | 48 |
| 4 days | | S | | 24 | S | 30 | 35 | 58 | 22 | 16 |
| 6 days | | | | 18 | | 27 | 32 | 57 | 24 | S |
| 9 days | | | | S | | 20 | 24 | 46 | S | |
| 12 days | | | | | | 22 | 25 | 57 | | |
| 200% modulus (kg./cm.²) after— | | | | | | | | | | |
| 0 day | 88 | 43 | 86 | 46 | 87 | 44 | 79 | 37 | 80 | 42 |
| 2 days | S | 18 | S | 48 | 39 | 79 | | 111 | | |
| 4 days | | S | | 38 | S | 57 | | | 43 | |
| 6 days | | | | 26 | | 46 | | 111 | 45 | S |
| 9 days | | | | S | | 27 | | 70 | S | |
| 12 days | | | | | | | | | | |
| 300% modulus (kg./cm.²) after — | | | | | | | | | | |
| 0 day | 131 | 73 | 128 | 73 | 129 | 71 | 122 | 63 | 119 | 88 |
| 2 days | S | 20 | S | 65 | | | | | | |
| 4 days | | S | | 49 | S | 75 | | | | |
| 6 days | | | | 35 | | 58 | | | | S |
| 9 days | | | | S | | 30 | | | S | |
| 12 days | | | | | | | | | | |
| Hardness (JIS) after— | | | | | | | | | | |
| 0 day | 63 | 59 | 62 | 50 | 63 | 57 | 64 | 58 | 65 | 59 |
| 2 days | S | 55 | S | 63 | 58 | 69 | 70 | 79 | 72 | 61 |
| 4 days | | S | | 67 | S | 70 | 69 | 79 | 66 | 58 |
| 6 days | | | | 65 | | 69 | 67 | 79 | 66 | S |
| 9 days | | | | S | | 70 | 66 | 81 | S | |
| 12 days | | | | | | 71 | | 82 | | |

EXAMPLES 19–27

The heat-aging properties (heating temperatures: 150° C.) of vulcanizates made by employing various types of

TABLE 3

| | Example | | | | | | | | |
|---|---|---|---|---|---|---|---|---|---|
| | 19 | 20 | 21 | 22 | 23 | 24 | 25 | 26 | 27 |
| Compounding components: | | | | | | | | | |
| Epichlorohydrin polymer | 100 | 100 | 100 | 100 | 100 | 100 | 100 | 100 | 100 |
| Tin stearate | 2 | 2 | 2 | 2 | 2 | 2 | 2 | 2 | 2 |
| FEF carbon black | 40 | 40 | 40 | 40 | 40 | 40 | 40 | 40 | 40 |
| Hexamethylenediamine | 1.5 | 1.5 | | | | | | | |
| Triethylenetetramine | | | 0.5 | 0.5 | | | | | |
| Diethylenetriamine | | | | | 0.5 | 0.5 | | | |
| Trimene base | | | | | | | 1.5 | 1.5 | 1.0 |
| Red lead | 5 | | 5 | | 5 | | 5 | | |
| Magnesium oxide | | 5 | | 5 | | 5 | | 5 | 5 |
| 2-mercaptobenzimidazole | 1 | 1 | 1 | 1 | 1 | 1 | 1 | 1 | 1 |
| Sulphur | | | | | | | | | 0.5 |
| Heat-aging properties of the vulcanizates: | | | | | | | | | |
| Tensile strength (kg./cm.²) after— | | | | | | | | | |
| 0 days | 143 | 141 | 103 | 53 | 129 | 115 | 105 | 69 | 135 |
| 3 days | 101 | 126 | 95 | 133 | 95 | 140 | 91 | 141 | 158 |
| 6 days | 72 | 97 | 71 | 118 | 65 | 131 | 65 | 92 | 139 |
| 9 days | 40 | 82 | 36 | 89 | 41 | 71 | 37 | 73 | 121 |
| 15 days | 31 | 69 | 33 | 84 | 27 | 44 | 28 | 42 | 81 |
| Elongation (percent) after— | | | | | | | | | |
| 0 day | 300 | 360 | 620 | 830 | 470 | 720 | 650 | 760 | 720 |
| 3 days | 170 | 300 | 260 | 330 | 220 | 270 | 280 | 330 | 260 |
| 6 days | 180 | 310 | 240 | 380 | 200 | 300 | 260 | 390 | 280 |
| 9 days | 170 | 330 | 250 | 360 | 220 | 300 | 280 | 380 | 270 |
| 15 days | 180 | 300 | 260 | 390 | 220 | 310 | 280 | 440 | 320 |
| Hardness (JIS) after — | | | | | | | | | |
| 0 day | 75 | 71 | 65 | 58 | 65 | 61 | 66 | 63 | 67 |
| 3 days | 78 | 82 | 72 | 75 | 70 | 78 | 70 | 79 | 81 |
| 6 days | 70 | 81 | 65 | 76 | 64 | 79 | 65 | 75 | 80 |
| 9 days | 68 | 83 | 63 | 75 | 61 | 79 | 61 | 76 | 82 |
| 15 days | 65 | 85 | 58 | 73 | 57 | 74 | 58 | 77 | 78 |

EXAMPLES 28–33

The heat-aging properties (heating temperature: 160° C.) of vulcanizates made by using thioureas in place of hexamethylenediamine carbamate which was employed in Examples 9–16 and 18 as well as the effect of sulphur addition were measured in the same manner. The compounded components and the results of the measurement are shown in Table 4.

TABLE 4

|  | Example |  |  |  |  |  |
|---|---|---|---|---|---|---|
|  | 28 | 29 | 30 | 31 | 32 | 33 |
| Compounding components: | | | | | | |
| Epichlorohydrin polymer | 100 | 100 | 100 | 100 | 100 | 100 |
| Tin stearate | 2 | 2 | 2 | 2 | 2 | 2 |
| FEF carbon black | 40 | 40 | 40 | 40 | 40 | 40 |
| 2,2′-methylene bis (4-methyl-6-tert-butylphenol) | 2 | 2 | 2 | 2 | 2 | 2 |
| Dibutyl thiourea | 1 | 1 | 1 | 1 | | |
| Thiourea | | | | | 1 | 1 |
| Red lead | 5 | | 5 | | 5 | |
| Magnesium oxide | | 5 | | 5 | | 5 |
| 2-mercaptobenzimidazole | 1 | 1 | 1 | 1 | 1 | 1 |
| Sulphur | | | 1 | 1 | 1 | 1 |
| Heat-aging properties of the vulcanizates: | | | | | | |
| Tensile strength (kg./cm.²) after— | | | | | | |
| 0 day | 130 | 100 | 161 | 151 | 126 | 127 |
| 2 days | 72 | 211 | 100 | 131 | 81 | 97 |
| 4 days | 65 | 92 | 82 | 131 | 67 | 82 |
| 6 days | 40 | 81 | 61 | 96 | 51 | 71 |
| 8 days | S | 73 | 50 | 90 | 30 | 67 |
| Elongation (percent) after— | | | | | | |
| 0 day | 490 | 820 | 480 | 890 | 350 | 360 |
| 2 days | 280 | 300 | 160 | 130 | 90 | 70 |
| 4 days | 280 | 280 | 140 | 120 | 80 | 50 |
| 6 days | 290 | 280 | 120 | 100 | 70 | 40 |
| 8 days | S | 280 | 100 | 70 | 70 | 30 |
| Hardness (JIS) after— | | | | | | |
| 0 day | 58 | 56 | 61 | 59 | 72 | 71 |
| 2 days | 62 | 68 | 72 | 76 | 76 | 82 |
| 4 days | 60 | 70 | 72 | 80 | 76 | 84 |
| 6 days | 56 | 71 | 65 | 82 | 74 | 88 |
| 8 days | S | 70 | 60 | 84 | 72 | 90 |

EXAMPLES 34–37

In addition to the respective compounded components in Examples 10, 12, 14 and 16, sulphur was added in the quantity of one part by weight, and the heat-aging properties (heating temperature: 160° C.) of the vulcanizates obtained in the same manner were measured. The results are given in Table 5. The comparison between the results of Table 5 and the respective examples employing the different quantities of 2-mercaptobenzimidazole in Examples 10, 12, 14 and 16 shows that the heat-aging properties can be remarkably improved by sulphur addition.

TABLE 5

| Example number | 34 | 35 | 36 | 37 |
|---|---|---|---|---|
| 2-mercaptobenzimidazole, parts by weight | 0.4 | 0.8 | 1.2 | 2.0 |
| Heat-aging properties of the vulcanizates: | | | | |
| Tensile strength (kg./cm.²) after— | | | | |
| 0 day | 161 | 166 | 158 | 149 |
| 2 days | 66 | 101 | 121 | 151 |
| 4 days | 36 | 64 | 97 | 137 |
| 6 days | 28 | 60 | 92 | 127 |
| 9 days | S | 28 | 34 | 73 |
| 12 days | | S | 36 | 58 |
| Elongation (percent) after— | | | | |
| 0 day | 590 | 550 | 660 | 650 |
| 2 days | 320 | 210 | 210 | 150 |
| 4 days | 350 | 240 | 240 | 170 |
| 6 days | 340 | 260 | 240 | 180 |
| 9 days | S | 240 | 210 | 160 |
| 12 days | | S | 74 | 60 |
| 100% modulus (kg./cm.²) after— | | | | |
| 0 day | 29 | 32 | 24 | 22 |
| 2 days | 30 | 50 | 62 | 105 |
| 4 days | 23 | 38 | 49 | 87 |
| 6 days | 21 | 37 | 50 | 84 |
| 9 days | S | 25 | 30 | 61 |
| 12 days | | S | | |
| 200% modulus (kg./cm.²) after— | | | | |
| 0 day | 63 | 71 | 52 | 49 |
| 2 days | 51 | 96 | | |
| 4 days | 31 | 60 | 88 | |
| 6 days | 26 | 55 | 85 | |
| 9 days | S | 27 | 34 | |
| 12 days | | S | | |
| 300% modulus (kg./cm.²) after— | | | | |
| 0 day | 99 | 113 | 88 | 79 |
| 2 days | 66 | | | |
| 4 days | | 35 | | |
| 6 days | | 27 | | |
| 9 days | S | | | |
| 12 days | | S | | |
| Hardness (JIS) after— | | | | |
| 0 day | 64 | 65 | 63 | 61 |
| 2 days | 72 | 72 | 78 | 82 |
| 4 days | 71 | 71 | 77 | 81 |
| 6 days | 71 | 71 | 86 | 84 |
| 9 days | S | 77 | 80 | 85 |
| 12 days | | S | 85 | 89 |

What is claimed is:

1. A vulcanizable composition which comprises:
    (a) 100 parts by weight of at least one polymer selected from the group consisting of:
        (i) a homopolymer of an epihalohydrin, and
        (ii) a copolymer of epihalohydrin and at least one monoepoxy monomer copolymerizable therewith;
    (b) 0.1–10 parts by weight of at least one compound selected from the group consisting of:
        (i) polyalkylenepolyamines,
        (ii) alkylenediamine carbamates, and
        (iii) thioureas with the following general formula

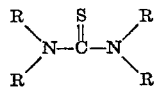

wherein each R can be hydrogen or an alkyl group of 1 to 4 carbon atoms and at least one R is hydrogen;
    (c) 1–20 parts by weight of magnesium oxide; and
    (d) 0.2–5 parts by weight of 2-mercaptobenzimidazole.
2. A vulcanizable composition according to claim 1 wherein the alkylenediamine carbamate is hexamethylenediamine carbamate.
3. A vulcanizable composition which comprises:
    (a) 100 parts by weight of at least one polymer selected from the group consisting of:
        (i) a homopolymer of an epihalohydrin, and
        (ii) a copolymer of epihalohydrin and at least one monoepoxy monomer copolymerizable therewith;
    (b) 0.1–10 parts by weight of at least one compound selected from the group consisting of:
        (i) polyalkylenepolyamines,
        (ii) alkylenediamine carbamates, and (iii) thioureas with the following general formula

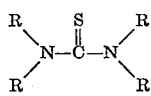

wherein each R can be hydrogen or an alkyl group of 1 to 4 carbon atoms and at least one R is hydrogen;
(c) 1–20 parts by weight of magnesium oxide;
(d) 0.2–5 parts by weight of 2-mercaptobenzimidazole; and
(e) 0.1–5 parts by weight of sulphur.

4. A vulcanizable composition according to claim 3 wherein the alkylenediamine carbamate is hexamethylenediamine carbamate.

5. A vulcanizate produced by a process which comprises heating the vulcanizable composition of claim 1.

6. A vulcanizate produced by a process which comprises heating the vulcanizable composition of claim 2.

7. A vulcanizate produced by a process which comprises heating the vulcanizable composition of claim 3.

8. A vulcanizate produced by a process which comprises heating the vulcanizable composition of claim 4.

References Cited
UNITED STATES PATENTS

| | | | |
|---|---|---|---|
| 2,700,028 | 1/1955 | Jarboe | 260—45.8 |
| 2,848,437 | 8/1958 | Langsdorf, Jr. et al. | 260—67 |
| 3,004,949 | 10/1961 | Chevassus | 260—45.75 |
| 3,239,486 | 3/1966 | Willis | 260—45.75 |
| 3,624,029 | 11/1971 | Inagami et al. | 260—45.9 |
| 3,341,491 | 9/1967 | Robinson et al. | 260—45.75 |
| 2,754,216 | 7/1956 | Chenicek | 260—800 |
| 3,255,146 | 6/1966 | Schlesmann et al. | 260—32.6 |
| 3,158,580 | 11/1964 | Vandenberg | 260—2 |
| 3,026,305 | 3/1962 | Robinson, Jr. | 260—79.5 |
| 1,933,762 | 11/1933 | Bogemann et al. | 260—800 |
| 3,026,270 | 3/1962 | Robinson, Jr. | 260—2 |
| 3,414,529 | 12/1968 | Green et al. | 260—2 |
| 3,453,357 | 7/1969 | Logan, Jr. | 264—236 |

DONALD E. CZAJA, Primary Examiner

R. A. WHITE, Assistant Examiner

U.S. Cl. X.R.

260—2 A, 79

PO-1050
(5/69)

UNITED STATES PATENT OFFICE
CERTIFICATE OF CORRECTION

Patent No. 3,790,524          Dated February 5, 1974

Inventor(s) Yoshiomi Saito et al

It is certified that error appears in the above-identified patent and that said Letters Patent are hereby corrected as shown below:

Column 2, line 48 - change "2,4" to -- 2.4 --.

Column 4, Table 1, line 7 - change "1.4" to -- 1.5 --.

Column 4, Table 1, line 7 - change "1.0" to -- 1.5 --.

Column 5, Table 2, - in the Elongation (percent) after section on the 4 days line, change the second occurrence of "190" to -- 290 --.

Column 7, Table 4, line 8 - change "2,2-methylene" to -- 2,2'-methylene --.

Column 7, Table 4, line 18 - change "211" to -- 112 --.

Signed and sealed this 17th day of December 1974.

(SEAL)
Attest:

McCOY M. GIBSON JR.
Attesting Officer

C. MARSHALL DANN
Commissioner of Patents